United States Patent
Lacroix

(10) Patent No.: US 8,029,892 B2
(45) Date of Patent: Oct. 4, 2011

(54) BREATHABLE FILM

(75) Inventor: Christophe Lacroix, Harquency (FR)

(73) Assignee: Atofina, Puteaux (FR)

( * ) Notice: Subject to any disclaimer, the term of this patent is extended or adjusted under 35 U.S.C. 154(b) by 0 days.

(21) Appl. No.: 10/333,803

(22) PCT Filed: Jul. 31, 2001

(86) PCT No.: PCT/FR01/02500
§ 371 (c)(1),
(2), (4) Date: Jul. 7, 2003

(87) PCT Pub. No.: WO02/12376
PCT Pub. Date: Feb. 14, 2002

(65) Prior Publication Data
US 2004/0029467 A1 Feb. 12, 2004

(30) Foreign Application Priority Data

Aug. 4, 2000 (FR) ..................... 00 10376

(51) Int. Cl.
*C08F 267/00* (2006.01)

(52) U.S. Cl. ........ 428/332; 525/408; 525/423; 525/926; 525/292; 525/68; 525/92 A; 525/179; 264/176.1

(58) Field of Classification Search .............. 428/332; 525/408, 423, 92 A, 179, 292, 926, 68; 264/176.1
See application file for complete search history.

(56) References Cited

U.S. PATENT DOCUMENTS

| | | | |
|---|---|---|---|
| 4,230,838 A | 10/1980 | Foy et al. | |
| 4,252,920 A | 2/1981 | Deleens et al. | |
| 4,331,786 A | 5/1982 | Foy et al. | |
| 4,332,920 A | 6/1982 | Foy et al. | |
| 4,483,975 A | 11/1984 | de Jong et al. | |
| 5,459,230 A | 10/1995 | de Jong et al. | |
| 5,506,024 A * | 4/1996 | Flesher | 428/85 |
| 5,869,414 A | 2/1999 | Fischer et al. | |
| 5,959,042 A * | 9/1999 | Bouilloux et al. | 525/420 |
| 6,051,649 A | 4/2000 | Alex et al. | |
| 6,706,851 B1 * | 3/2004 | Linemann et al. | 528/271 |

FOREIGN PATENT DOCUMENTS

| | | |
|---|---|---|
| EP | 0 476 963 A2 | 3/1992 |
| EP | 0 527 447 A1 | 2/1993 |
| EP | 0 613 919 A1 | 9/1994 |
| EP | 0 675 167 A1 | 10/1995 |
| EP | 0 688 826 A1 | 12/1995 |
| EP | 0 842 969 A1 | 5/1998 |
| WO | WO 0129113 A1 * | 4/2001 |

OTHER PUBLICATIONS

International Search Report for International Application No. PCT/FR 01/02500.

* cited by examiner

*Primary Examiner* — Elizabeth Cole
(74) *Attorney, Agent, or Firm* — Husch Blackwell LLP

(57) ABSTRACT

A breathable film includes at least one polymer (a) taken from the group comprising an ethylene/alkyl (meth)acrylate copolymer (a1), an optionally neutralized ethylene/ (meth) acrylic acid copolymer (a2), an ethylene/vinyl monomer copolymer (a3), the (a1)/(a2) blend, the (a1)/(a3) blend, the (a2)/(a3) blend and the (a1)/(a2)/(a3) blend, and/or includes at least one functionalized polyethylene (b); and at least one copolymer (c) having copolyamide blocks or polyester blocks and polyether blocks.

13 Claims, No Drawings ated epoxide, by grafting or by copolymerization.
BREATHABLE FILM This application is a national stage entry of pCT/FR01/02500 filed Jul. 31, 2001.

The subject of the invention is a breathable film, that is to say a material permeable to water vapor but impermeable to water.

EP-A-0 688 826 discloses such a film, consisting of a blend comprising: (a) at least one thermoplastic elastomer having polyether blocks and (b) at least one copolymer, comprising ethylene and at least one alkyl (meth)acrylate. The elastomer (a) may be a polyetheresteramide. The copolymer (b) may be a blend of a first ethylene/alkyl (meth)acrylate copolymer (b1) and of a second ethylene/alkyl (meth)acrylate copolymer (b2) functionalized especially by maleic anhydride or glycidyl methacrylate. The thermoplastic elastomer having polyether blocks may be one with polyamide blocks, this polyamide block being a homopolyamide.

However, it is endeavored to find films whose constituents may be easily blended and which result in films having good drawability, even at high speed, while maintaining the qualities required of a breathable film, namely a relative permeability, a low moisture uptake (which otherwise would cause the films to swell), sufficient flexibility and easy bonding to nonwovens.

Breathable films have now been found which have a high permeability while having a low moisture uptake, which are easy to extrude at high speed and without defects, which do not block and which have a silky appearance. The films according to the invention possess a high elongation before breaking. They may be easily combined with nonwovens, especially without using an adhesive, by directly laminating them to the nonwoven.

The invention relates to a breathable film comprising a blend:
- of at least one polymer (a) taken from the group comprising an ethylene/alkyl (meth)acrylate copolymer (a1), an optionally neutralized ethylene/(meth)acrylic acid copolymer (a2), an ethylene/vinyl monomer copolymer (a3), the (a1)/(a2) blend, the (a1)/(a3) blend, the (a2)/(a3) blend and the (a1)/(a2)/(a3) blend; and/or
- of at least one functionalized polyethylene (b); and
- of at least one copolymer (c) having copolyamide blocks or polyester blocks and polyether blocks.

According to one embodiment of the breathable film, the copolymer (c) has a melting point of between 80 and 150° C., preferably between 90 and 135° C.

According to one embodiment of the breathable film, the copolymer (c) having copolyamide blocks and polyether blocks is a polyetheresteramide.

According to one embodiment of the breathable film, the copolyamide blocks result from the condensation of at least one alpha,omega-aminocarboxylic acid or a lactam, at least one diamine and at least one dicarboxylic acid.

According to one embodiment of the breathable film, the copolyamide blocks derive from 6, 11, 12, 6,6, 6,10 or 6,12 blocks.

According to one embodiment of the breathable film, the polyether blocks are PEG blocks.

According to one embodiment of the breathable film, the alkyl (meth)acrylate (a1) is chosen from n-butyl acrylate, isobutyl acrylate, 2-ethylhexyl acrylate, cyclohexyl acrylate, n-octyl acrylate, methyl methacrylate and ethyl methacrylate.

According to one embodiment of the breathable film, the functionalized polyethylene (b) is a functionalized ethylene/alkyl (meth)acrylate copolymer.

According to one embodiment of the breathable film, the functionalized polyethylene (b) is a polyethylene or an ethylene/alkyl (meth)acrylate copolymer, functionalized by a monomer chosen from (i) an unsaturated carboxylic acid, (ii) an unsaturated carboxylic acid anhydride and (iii) an unsaturated epoxide, by grafting or by copolymerization.

According to one embodiment of the breathable film, the functionalized polyethylene (b) is grafted or copolymerized with a glycidyl methacrylate.

According to one embodiment of the breathable film, the polymer (b) represents from 1 to 40%, preferably from 2 to 20%, more preferably from 3 to 15% by weight of the final composition.

According to one embodiment of the breathable film, the polymer (c) represents from 20 to 95%, preferably from 25 to 80%, more preferably from 30 to 70% by weight of the final composition.

According to one embodiment of the breathable film, the polymer (a) represents from 10 to 90%, preferably from 40 to 80% by weight of the final composition.

According to one embodiment of the breathable film, the sum of the polymers (a) and (b) preferably represents more than 50%, more preferably more than 55% by weight of the final composition.

According to one embodiment of the breathable film, the sum of the polymers (a) and (b) preferably represents less than 50%, more preferably less than 45% by weight of the final composition.

According to one embodiment of the breathable film, the latter comprises:
- from 40 to 80%, preferably 45 to 75%, of the polymer (a);
- from 2 to 20%, preferably 3 to 15% of the copolymer (b);
- the sum of the constituents (a) and (b) being equal to at least 50%, preferably at least 55%; and
- from 18 to 50%, preferably 20 to 50%, even more preferably 22 to 45%, and even more preferably 25 to 45% of at least one copolymer (c) having copolyamide blocks or polyester blocks and polyether blocks.

According to one embodiment of the breathable film, the latter has a thickness of between 10 and 200 μm.

The invention also relates to a process for manufacturing a film as described above, which comprises the extrusion of the latter.

The subject of the invention is also a breathable material comprising the film, as described above, combined with a nonwoven or with a woven.

According to one embodiment, the breathable material is characterized in that the copolymer blend making up the breathable film is extruded and laminated to a woven or nonwoven fabric substrate. The invention also provides a process for manufacturing this breathable material, comprising the extrusion and the lamination of the copolymer blend making up the film according to the invention to a woven or nonwoven fabric substrate.

Copolymer (a)

This ethylene copolymer may be based on an alkyl (meth)acrylate (copolymer (a1)) or based on an optionally neutralized (meth)acrylic acid (copolymer (a2)) or based on a vinyl monomer (copolymer (a3)), or may be a blend of copolymers (a1) or (a2) or (a3) or of these copolymers.

With regard to the copolymer (a1), this is based on ethylene and on an alkyl (meth)acrylate, which in general represents from 5 to 40%, preferably from 10 to 35%, by weight of the copolymer.

The alkyl (meth)acrylate monomer may have up to 24 and preferably 10 carbon atoms and may be linear, branched or cyclic. As an illustration of the alkyl (meth)acrylate, mention may especially be made of n-butyl acrylate, isobutyl acrylate, 2-ethylhexyl acrylate, cyclohexyl acrylate, methyl methacrylate and ethyl methacrylate. Among these (meth)acrylates, ethyl acrylate, n-butyl acrylate and methyl methacrylate are preferred.

The MFI (Melt Flow Index) of these copolymers (a1) is advantageously between 0.1 and 50 g/10 min (190° C./2.16 kg). The copolymers may be manufactured by radical polymerization in a tube or autoclave at pressures of between 300 and 2500 bar.

With regard to the copolymer (a2), this is based on ethylene and on (meth)acrylic acid, which in general represents up to 10 mol % and advantageously between 1 and 5 mol % of (a2). It would not be outside the scope of the invention if (a2) were furthermore to comprise an alkyl (meth)acrylate in a proportion possibly up to 40% by weight of (a2). The acid functional groups may be completely or partially neutralized by a cation such as lithium, sodium, potassium, magnesium, calcium, strontium, zinc or cadmium. The MFI of these copolymers is advantageously between 0.1 and 50 g/10 min. These copolymers may be manufactured by radical polymerization in a tube or autoclave at pressures of between 300 and 2500 bar.

With regard to the copolymer (a3), this is based on ethylene and on a vinyl monomer such as vinyl acetate, vinyl propionate, methyl vinyl ketone, vinylpyrrolidone, vinylcaprolactam, and vinyl ethers, in particular methyl, ethyl and isobutyl ethers, this monomer in general representing from 5 to 40%, preferably from 10 to 35%, by weight of the copolymer.

These copolymers are commercially available.

It would not be outside the scope of the invention if two or more copolymers were to be used.

Polymer (b)

This polymer is based on ethylene, but it also carries functionalities. These functionalities are chosen, for example, from (i) an unsaturated carboxylic acid, (ii) an unsaturated carboxylic acid anhydride or (iii) an unsaturated epoxide. Other functionalities are also possible, such as isocyanate, isoxazone, etc. These functionalities may be provided by grafting or by copolymerization or terpolymerization.

As an example of unsaturated carboxylic acids, mention may be made of (meth)acrylic acid, crotonic acid and cinnamic acid.

This copolymer is advantageously a copolymer (b1) which is an ethylene/unsaturated carboxylic acid anhydride copolymer; it may be a polyethylene grafted by an unsaturated carboxylic acid anhydride or a copolymer of ethylene with an unsaturated carboxylic acid anhydride monomer, which is obtained, for example, by radical copolymerization.

The anhydride of unsaturated carboxylic acid may be chosen, for example, from maleic, itaconic, citraconic, allylsuccinic, cyclohex-4-ene-1,2-dicarboxylic, 4-methylenecyclohex-4-ene-1,2-dicarboxylic, bicyclo[2,2,1]hept-5-ene-2,3-dicarboxylic and x-methylbicyclo[2,2,1]hept-5-ene-2,2-dicarboxylic anhydrides. Advantageously, maleic anhydride is used. It would not be outside the scope of the invention to replace all or part of the anhydride with an unsaturated carboxylic acid such as, for example, (meth)acrylic acid.

With regard to the polyethylenes onto which the unsaturated carboxylic acid anhydride is grafted, the term "polyethylene" is understood to mean homopolymers or copolymers.

As examples of comonomers, mention may be made of:
  alpha-olefins, advantageously those having 3 to 30 carbon atoms; examples of alpha-olefins include propylene, 1-butene, 1-pentene, 3-methyl-1-butene, 1-hexene, 4-methyl-1-pentene, 3-methyl-1-pentene, 1-octene, 1-decene, 1-dodecene, 1-tetradecene, 1-hexadecene, 1-octadecene, 1-eicocene, 1-docosene, 1-tetracocene, 1-hexacocene, 1-octocosene and 1-triacontene; these alpha-olefins may be used by themselves or as a mixture of two or more of them;
  esters of unsaturated carboxylic acids such as, for example, alkyl (meth)acrylates, the alkyls possibly having up to 24 carbon atoms; examples of alkyl acrylates or methacrylates are especially methyl methacrylate, ethyl acrylate, n-butyl acrylate, isobutyl acrylate, 2-ethylhexyl acrylate and n-octyl acrylate;
  vinyl esters of saturated carboxylic acids such as, for example, vinyl acetate or vinyl propionate;
  dienes such as, for example, 1,4-hexadiene.

The polyethylene may comprise several of the above comonomers.

The copolymers mentioned in (a) are also appropriate.

Advantageously, the polyethylene, which may be a blend of several polymers, comprises at least 50 mol % and preferably 75 mol % of ethylene and its density may be between 0.86 and 0.98 g/cm$^3$. The MFI (melt flow index at 190° C./2.16 kg) is advantageously between 0.1 and 1000 g/10 min.

By way of examples of polyethylenes, mention may be made of:
  low-density polyethylene (LDPE)
  high-density polyethylene (HDPE)
  linear low-density polyethylene (LLDPE)
  very low-density polyethylene (VLDPE)
  polyethylene obtained by metallocene catalysis, that is to say polymers obtained by the copolymerization of ethylene and of alpha-olefin such as propylene, butene, hexene or octene in the presence of a single-site catalyst generally consisting of a zirconium or titanium atom and of two alkyl cyclic molecules linked to the metal. More specifically, the metallocene catalysts are usually composed of two cyclopentadiene rings linked to the metal. These catalysts are frequently used with aluminoxanes as cocatalysts or activators, preferably methylaluminoxane (MAO). Hafnium may also be used as the metal to which the cyclopentadiene is attached. Other metallocenes may include transition metals of Groups IV A, V A and VI A. Metals from the series of lanthanides may also be used;
  EPR (ethylene-propylene-rubber) elastomers
  EPDM (ethylene-propylene-diene monomer) elastomers
  blends of polyethylene with an EPR or an EPDM
  ethylene/alkyl (meth)acrylate copolymers possibly containing up to 60%, and preferably 2 to 40%, by weight of (meth)acrylate.

The grafting is an operation known per se. For example, the monomer to be grafted is introduced into an appropriate zone of an extruder charged beforehand with the polymer to be grafted, which is in the melt state during grafting (in general a peroxide is present). The grafting may also be carried out in a solvent phase.

With regard to the ethylene/unsaturated carboxylic acid anhydride copolymers, that is to say those in which the unsaturated carboxylic acid anhydride is not grafted, these are copolymers of ethylene with an unsaturated carboxylic acid anhydride and optionally with another monomer that can be chosen from the comonomers mentioned above in the case of the ethylene copolymers intended to be grafted.

Advantageously, ethylene/maleic anhydride and ethylene/alkyl (meth)acrylate/maleic anhydride copolymers are used. These copolymers comprise from 0.2 to 10% by weight of maleic anhydride and from 0 to 40%, preferably 5 to 40%, by weight of alkyl (meth)acrylate. Their MFI is between 0.5 and 200 (190° C./2.16 kg). The alkyl (meth)acrylates have already been described above. It is possible to use a blend of several copolymers (b1) and it is also possible to use a blend of an ethylene/maleic anhydride copolymer and of an ethylene/alkyl (meth)acrylate/maleic anhydride copolymer.

The copolymer (b1) is commercially available. It is produced by radical polymerization at a pressure possibly between 200 and 2500 bar. It is sold in the form of granules.

This copolymer is advantageously a copolymer (b2) which is an ethylene/unsaturated epoxide copolymer.

This copolymer (b2) may be obtained by copolymerizing ethylene and an unsaturated epoxide or by grafting the unsaturated epoxide onto the polyethylene. Grafting is an operation described above and is known per se. As regards the copolymerization of ethylene and an unsaturated epoxide, processes known as radical polymerization processes, usually operating at pressures of between 200 and 2500 bar, may be used.

As examples of unsaturated epoxides, mention may be made of:
  aliphatic glycidyl esters and ethers such as allyl glycidyl ether, vinyl glycidyl ether, glycidyl maleate, glycidyl itaconate, glycidyl acrylate and glycidyl methacrylate; and
  alicyclic glycidyl esters and ethers, such as 2-cyclohex-1-ene glycidyl ether, 4,5-diglycidyl cyclohexene carboxylate, 4-glycidyl cyclohexene carboxylate, glycidyl 2-methyl-5-norbornene-2-carboxylate and diglycidyl endo-cis-bicyclo[2,2,1]hept-5-ene-2,3-dicarboxylate.

With regard to the grafting, the copolymer is obtained by grafting a polyethylene homopolymer or copolymer as described in the case of (b1) except that an epoxide is grafted instead of an anhydride. With regard to copolymerization, this is also similar to (b1), except that an epoxide is used; there may also be other comonomers, as in the case of (b1).

The embodiments described in the case of (b1) apply mutatis mutandis in the case of (b2).

The product (b2) is advantageously an ethylene/alkyl (meth)acrylate/unsaturated epoxide copolymer (obtained by terpolymerization or preferably by grafting) or an ethylene/unsaturated epoxide copolymer (obtained by copolymerization or preferably by grafting). Advantageously, it may contain up to 40%, preferably from 5 to 40%, by weight of alkyl (meth)acrylate and up to 10%, preferably from 0.1 to 8%, by weight of unsaturated epoxide.

Advantageously, the epoxide is glycidyl (meth)acrylate.

Advantageously, the alkyl (meth)acrylate is identical to that described above in relation to (b1) and is preferably chosen from methyl (meth)acrylate, ethyl acrylate, n-butyl acrylate, isobutyl acrylate and 2-ethylhexyl acrylate. The amount of alkyl (meth)acrylate is advantageously from 10 to 35%. The MFI is advantageously between 0.5 and 200 (in g/10 min at 190° C./2.16 kg). It is possible to use a blend of several copolymers (b2) and it is also possible to use a blend of an ethylene/alkyl (meth)acrylate/ unsaturated epoxide copolymer and of an ethylene/ unsaturated epoxide copolymer.

This copolymer (b2) may be obtained by the radical polymerization of the monomers.

It is also possible to use a blend of copolymers (b1) and (b2).

Other Polymers

Apart from the polymers (a) or (b), it is possible to use other polymers as a blend, these being inert with respect to the other components and compatible with them. For example, it is possible to use polyolefins, and in particular the ethylene polymers and copolymers mentioned within the context of polymers (a) and (b).

Thus, a PE (LDPE, LLDPE, HDPE, etc.) may be added to a blend of polymers (b) and (c).

Copolymer (c)

This copolymer is:
  a copolymer having copolyamide blocks and polyether blocks, which has the advantage, over the copolymer described in EP-A-0688826, of having a lower melting point and consequently of being blended more easily with the acrylic copolymers (a) and/or (b), resulting in the formation of a continuous phase that guarantees impermeability/breathability; or
  a copolymer having polyester blocks and polyether blocks.

These copolymers (c) generally have a melting point of between 80 and 150° C., preferably between 90 and 135° C. This allows the viscosities of the polymers (a), (b) and (c) to be more easily adjusted, thereby improving the processability of the final composition.

The polymers having copolyamide blocks and polyether blocks generally have Shore D hardnesses that may be between 20 and 75 and advantageously between 30 and 70 and an intrinsic viscosity of between 0.8 and 1.75 dl/g, measured in metacresol at 25° C. for an initial concentration of 0.5 g/100 ml.

The polymers having copolyamide blocks and polyether blocks result from the copolycondensation of copolyamide blocks having reactive end groups with polyether blocks having reactive end groups, such as, inter alia:
  (1) copolyamide blocks having diamine chain ends with polyoxyalkylene blocks having dicarboxylic chain ends;
  (2) copolyamide blocks having dicarboxylic chain ends with polyoxyalkylene blocks having diamine chain ends obtained by cyanoethylation and hydrogenation of aliphatic dihydroxylated alpha,omega-polyoxyalkylene blocks called polyetherdiols;
  (3) copolyamide blocks having dicarboxylic chain ends with polyetherdiols, the products obtained being, in this particular case, polyetheresteramides.

It is preferred to use those of the latter category.

The copolyamide blocks having dicarboxylic chain ends derive, for example, from the condensation of at least one alpha,omega-aminocarboxylic acid (or a lactam), at least one diamine and at least one dicarboxylic acid.

As examples of alpha,omega-aminocarboxylic acids, mention may be made of those having from 6 to 12 carbon atoms and especially aminoundecanoic acid and aminododecanoic acid.

As examples of lactams, mention may be made of those having from 6 to 12 carbon atoms and especially caprolactam (in this case, it will be preferred that the copolyamide resulting therefrom be purified of the caprolactam monomer which is optionally dissolved therein) and lauryllactam.

By way of examples of dicarboxylic acids, mention may be made of those having from 4 to 12 carbon atoms and in particular of adipic acid, sebacic acid, isophthalic acid, butanedioic acid, 1,4-cyclohexyldicarboxylic acid, terephthalic acid, the sodium or lithium salt of sulfoisophthalic acid, dimerized fatty acids (these dimerized fatty acids have a dimer content of at least 98% and are preferably hydrogenated) and dodecanedioic acid $HOOC-(CH_2)_{10}-COOH$.

The diamine may be an aliphatic diamine having from 6 to 12 carbon atoms or it may be an aryl diamine or a saturated cyclic diamine, and in particular hexamethylenediamine, piperazine and its derivatives, tetramethylenediamine, octamethylenediamine, decamethylenediamine, dodecamethylenediamine, 1,5-diaminohexane, 2,2,4-trimethyl-1,6-diaminohexane, diamine polyols, isophoronediamine (IPD), methylpentamethylenediamine (MPDM), bis(aminocyclohexyl)methane (BACM) and bis(3-methyl-4-aminocyclohexyl)methane (BMACM).

The number-average molar mass $M_n$ of the copolyamide blocks is generally between 300 and 5000 and preferably between 400 and 1000.

The various constituents of the copolyamide block are advantageously chosen so as to result, in the final polymer, in a melting point of between, for example, 90 and 135° C.

The copolyamide blocks derive from two, three, four or more 6, 11, 12, 6,6, 6,10 and 6,12 units or any other unit deriving from lactams, amino acids and a diamine-diacid pair, especially those described above. The respective proportions may vary widely, depending on the desired final properties, for example the melting point.

As examples of copolyamide blocks, mention may be made of the following A/B/C copolyamide blocks in which:

A is 6 or 6,6;
B is 11 or 12; and
C is 6,10 or 6,12;

6 denoting units resulting from the condensation of caprolactam, 6,6 denoting hexamethylenediamine condensed with adipic acid, 11 denoting units resulting from the condensation of aminoundecanoic acid, 12 denoting units resulting from the condensation of lauryllactam or of aminododecanoic acid, 6,10 denoting hexamethylenediamine condensed with decanedioic acid and 6,12 denoting hexamethylenediamine condensed with dodecanedioic acid.

The proportions by weight are 20 to 30 in the case of A, 20 to 30 in the case of B and 15 to 25 in the case of C, the total being 70, and advantageously 22 to 28 in the case of A, 22 to 28 in the case of B and 18 to 24 in the case of C, the total being 70.

With regard to the copolymers (c) having polyester blocks and polyether blocks, these consist of soft polyether blocks, which are the residues of polyetherdiols, and of rigid segments (polyester blocks) which result from the reaction of at least one dicarboxylic acid with at least one short diol chain-extender unit. The polyether blocks and the polyester blocks are linked by ester linkages resulting from the reaction of the acid functional groups of the acid with the OH functional groups of the polyetherdiol. The short chain-extender diol may be chosen from the following glycols: neopentylglycol, cyclohexanedimethanol and aliphatic glycols of formulae $HO(CH_2)_nOH$ in which n is an integer from 2 to 10. The copolyetheresters are thermoplastic elastomers. According to one form of the invention, the polyester blocks result from the reaction of a short chain-extender diol with at least one dicarboxylic acid containing an ionic functional group, for example a sulfone group, and optionally with other dicarboxylic acids (different from the sulfonated dicarboxylic acid) or with their derivatives. According to another form of the invention, the polyether blocks of these copolymers (c) are polyetherdiols and result from the chain-linking of polyether blocks and from a dicarboxylic acid containing an ionic functional group. Advantageously, the proportions are such that there is one more polyetherdiol block than functional dicarboxylic acid, so that the functional dicarboxylic acid is within the chain and the chain thus has OH terminal groups.

A blend of several copolymers (c) having polyester blocks and polyether blocks may be used.

The polyether may, for example, be a polyethylene glycol (PEG), a polypropylene glycol (PPG) or a polytetramethylene glycol (PTMG), also called polytetrahydrofuran (PTHF). Whether the polyether blocks are in the chain of the polymer having polyamide blocks and polyester blocks in the form of diols or diamines, to simplify matters they are called PEG blocks or PPG blocks or PTMG blocks. It would not be outside the scope of the invention if the polyether blocks were to contain different units such as units derived from ethylene glycol ($—OC_2H_4—$), propylene glycol ($—OCH_2—CH(CH_3)—$) or tetramethylene glycol ($—O—(CH_2)_4—$). It is also possible to use blocks obtained by oxyethylation of bisphenol A; the latter products are described in EP-A-0 613 919. The preferred polyether is PEG, by itself or in a blend.

The mass $M_n$ of the polyether blocks is in general between 100 and 6000 and preferably between 200 and 3000.

The polymers having copolyamide blocks and polyether blocks may also include randomly distributed units.

The amount of polyether blocks represent in general between 5 and 85%, preferably between 10 and 50%, by weight of the final polymer.

Copolyamides useful in the invention are especially described in the patents U.S. Pat. No. 4,483,975, DE 3 730 504 and U.S. Pat. No. 5,459,230.

The copolymers of the invention may be prepared by any means for attaching polyamide blocks to polyether blocks. In practice, two processes are essentially used, one called a 2-step process and the other a 1-step process.

The 2-step process firstly consists in preparing the polyamide blocks having carboxylic end groups by the condensation of polyamide precursors in the presence of a dicarboxylic acid chain stopper and then, in a second step, in adding the polyether and a catalyst. If the polyamide precursors are only lactams or alpha,omega-aminocarboxylic acids, a dicarboxylic acid is added. If the precursors already include a dicarboxylic acid, this is used in excess with respect to the stoichiometry of the diamines. The reaction is usually carried out between 180 and 300° C., preferably 200 to 260° C., the pressure in the reactor is established between 5 and 30 bar, and this is maintained for about 2 hours. The pressure is slowly reduced, bringing the reactor to atmospheric pressure, and then the excess water is distilled, for example for one or two hours.

Having prepared the polyamide having carboxylic acid end groups, the polyether and a catalyst are then added. The polyether may be added in one or more stages, as is the catalyst. According to an advantageous form, the polyether is firstly added and the reaction of the OH end groups of the polyether and the COOH end groups of the polyamide starts with the formation of an ester linkage and the elimination of water; as much water as possible is removed from the reaction mixture by distillation, and then the catalyst is introduced in order to achieve the linking of the polyamide blocks to the polyether blocks. This second step is carried out with stirring, preferably under vacuum of at least 5 mmHg (650 Pa) at a temperature such that the reactants and the copolymers obtained are in the melt state. As an example, this temperature may be between 100 and 400° C. and usually between 200 and 300° C. The reaction is monitored by measuring the torque exerted by the molten polymer on the stirrer or by measuring the electrical power consumed by the stirrer. The end of the reaction is determined by the value of the target power or torque. The catalyst is defined as being any product making it possible to facilitate the linking of the polyamide blocks to the polyether blocks by esterification. Advantageously, the catalyst is a derivative of a metal (M) chosen from the group formed by titanium, zirconium and hafnium.

As an example of derivatives, mention may be made of tetraalkoxides which satisfy the general formula $M(OR)_4$, in which M represents titanium, zirconium or hafnium and R, which are identical or different, denote linear or branched alkyl radicals having from 1 to 24 carbon atoms.

The $C_1$-$C_{24}$ alkyl radicals, from which the R radicals of the tetraalkoxides used as catalysts in the process according to the invention are chosen, are, for example, such as methyl, ethyl, propyl, isopropyl, butyl, ethylhexyl, decyl, dodecyl and hexadodecyl. The preferred catalysts are the tetraalkoxides for which the radicals R, which are identical or different, are $C_1$-$C_8$ alkyl radicals. Examples of such catalysts are especially $Zr(OC_2H_5)_4$, $Zr(O\text{-isoC}_3H_7)_4$, $Zr(OC_4H_9)_4$, $Zr(OC_5H_{11})_4$, $Zr(OC_6H_{13})_4$, $Hf(OC_2H_5)_4$, $Hf(OC_4H_9)_4$ and $Hf(O\text{-isoC}_3H_7)_4$.

The catalyst used in this process according to the invention may consist only of one or more of the tetraalkoxides of formula $M(OR)_4$ defined above. It may also be formed by combining one or more of these tetraalkoxides with one or more alkali metal or alkaline-earth metal alcoolates of formula $(R_1O)_pY$ in which $R_1$ denotes a hydrocarbon residue, advantageously a $C_1$-$C_{24}$, preferably $C_1$-$C_8$, alkyl residue, Y represents an alkali metal or alkaline-earth metal and p is the valency of Y. The amounts of alkali metal or alkaline-earth metal alcoolate and of zirconium or hafnium tetraalkoxides that are combined to constitute the hybrid catalyst may vary widely. However, it is preferred to use alcoolate and tetraalkoxide quantities such that the molar proportion of alcoolate is substantially equal to the molar proportion of tetraalkoxide.

The proportion by weight of catalyst, that is to say of the tetraalkoxide(s) when the catalyst does not contain an alkali or alkaline-earth metal alcoolate or else all of the tetraalkoxides(s) and the alkali or alkali-earth metal alcoolate(s) when the catalyst is formed by combining these two types of compounds, advantageously varies from 0.01 to 5% by weight of the dicarboxylic polyamide/polyoxyalkylene glycol blend and preferably lies between 0.05 and 2% of this weight.

As examples of other derivatives, mention may also be made of the salts of the metal (M), in particular salts of (M) and an organic acid and the complex salts between the oxide of (M) and/or the hydroxide of (M) and an organic acid. Advantageously, the organic acid may be formic acid, acetic acid, propionic acid, butyric acid, valeric acid, caproic acid, caprylic acid, lauric acid, myristic acid, palmitic acid, stearic acid, oleic acid, linolic acid, linolenic acid, cyclohexanecarboxylic acid, phenylacetic acid, benzoic acid, salicylic acid, oxalic acid, malonic acid, succinic acid, glutaric acid, adipic acid, maleic acid, fumaric acid, phthalic acid and crotonic acid. Acetic and propionic acid are particularly preferred. Advantageously, M is zirconium. These salts may be called zirconyl salts. The Applicant, without being tied to this explanation, believes that these salts of zirconium and an organic acid or the complex salts mentioned above liberate $ZrO^{++}$ during the process. The product sold under the name zirconyle acetate is used. The amount to be used is the same as in the case of the $M(OR)_4$ derivatives.

This process and these catalysts are disclosed in the U.S. Pat. Nos. 4,332,920, 4,230,838, 4,331,786, and 4,252,920, JP 07145368A, JP 06287547A and EP 613919.

With regard to the one-step process, all the reactants used in the two-step process, that is to say the polyamide precursors, the dicarboxylic acid chain stopper, the polyether and the catalyst, are blended together. These are the same reactants and the same catalysts as in the two-step process described above. If the polyamide precursors are only lactams, it is advantageous to add a little water.

The copolymer essentially has the same polyether blocks and the same polyamide blocks, but also a small fraction of the various reactants that have reacted randomly, which are randomly distributed along the polymer chain.

The reactor is closed and heated with stirring as in the first step of the two-step process described above. The pressure is set between 5 and 30 bar. When there is no longer any change, the reactor is put under reduced pressure, while maintaining vigorous stirring of the molten reactants. The reaction is followed as previously in the case of the two-step process.

The catalyst used in the one-step process is preferably a salt of the metal (M) and an organic acid or a complex salt between the oxide of (M) and/or the hydroxide of (M) and an organic acid.

Composition

The composition comprises either (a) or (b), or both, optionally with a polyolefin or another polymer which is inert with respect to the other components and compatible with them. Preferably, (b) is present.

When the polymer (a) is present, it represents in general from 10 to 90%, preferably from 40 to 80%, more preferably from 45 to 75% by weight of the final composition.

The polymer (b) represents in general from 1 to 40%, preferably from 2 to 20% and more preferably from 3 to 15% by weight of the final composition.

The polymer (c) represents in general from 8 to 70%, preferably from 18 to 50%, more preferably from 22 to 45% by weight of the final composition.

According to one embodiment, the sum (a)+(b) represents more than 50%, more preferably more than 55%, by weight of the composition.

According to another embodiment, the sum (a)+(b) represents less than 50%, more preferably less than 45%, by weight of the composition.

The above two cases correspond to those in which the polymer (c) does or does not represent the minority phase.

Film

The films according to the invention have a thickness that may be, for example, between 10 and 200 µm and preferably 15 and 35 µm. The polymer blend constituting the breathable film of the invention may optionally contain organic and/or mineral fillers. As examples of fillers, mention may especially be made of silica and titanium oxide. The blend may also contain various additives such as UV stabilizers, demolding agents, impact modifiers, etc., as well as dyes or pigments. These blends are manufactured by standard melt-blending techniques, and then they are made into film by techniques known per se, especially by extrusion. They may be prepared by high-speed extrusion. The films of the invention are impermeable to water and to aqueous solutions, they are permeable to water vapor and are not microporous, that is to say they are continuous films. They have a good water vapor permeability, which may reach 10 000, preferably 20 000 and advantageously 25 000 g/m²0.24 h according to the ASTM E 96BW standard (for films in contact with water). They have a water uptake fairly substantially less than that of a film essentially consisting of a polymer comprising PEG blocks. The films are non-blocking, they are flexible, they have a silky feel, and they do not make a noise. These films are useful for making dressings, patches, ostomy pouches, and gloves. The invention also relates to these articles.

The films of the invention may be fastened to a woven or nonwoven material essentially without any adhesive, for example by hot-lamination or pressing. The film may be hot-laminated or it may be deposited directly in the melt state, for example deposited on the material by extrusion. It is also possible to use adhesives either as a complete layer between the breathable film and the nonwoven or in bands or any discontinuous application, such as dotted lines or spots. These adhesives may be hot-melts. The present invention also relates to these breathable materials formed from the film of the invention combined with a woven or a nonwoven. It would not be outside the scope of the invention to add other layers, either on the breathable film side or on the woven or nonwoven side, it being possible for these other layers to be wovens or nonwovens identical or different to those already present. These breathable materials formed from the breathable film combined with a woven or nonwoven are flexible and, since the film has a low water uptake, it delaminates less easily from the woven or the nonwoven than a film consisting only of the polymer having polyether blocks.

These materials (a woven or nonwoven coated with the film according to the invention) are useful for making protective garments for medical personnel, disposable hygiene articles, blanket undersheets, roof decking films for houses, clothes and shoes.

As a woven, it is possible to use any woven used in the textile industry, in particular for clothing, such as for example cotton, polyamide or polyester.

As a nonwoven, it is possible to use any nonwoven, especially one based on cellulose fibers or plant-based fibers or based on fibers of a homopolymer or copolymer polyolefin such as, for example, polyethylene, polypropylene or ethylene/alkyl (meth) alcrylate copolymers.

The following examples illustrate the invention without restricting it.

Preparation of the 6/11/6.12/PEG$_{600}$.12 copolymer in proportions of 24.5/24.5/21/30.

The following monomers were introduced into an autoclave fitted with a stirrer; 2.44 kg of caprolactam, 2.44 kg of aminoundecanoic acid, 2.25 kg of dodecanedioic acid and 0.70 kg of hexamethylenediamine (in the form of a 73.1% solution in water).

The mixture thus formed was put in an inert atmosphere and heated until the temperature reached 260° C., while maintaining vigorous stirring as soon as the reactants melted. The temperature of 260° C. and the pressure of 20 bar were maintained for 2 hours (precondensation). Next, the pressure was slowly reduced (over 1.25 h) from 25 bar to atmospheric pressure and the temperature from 260 to 245° C. A fine dispersion (even a solution) of 2.17 kg of dihydroxylated polyethylene (PEG600, M$_n$=600) and 19 g of zirconyl acetate (in a 22 wt % acetic acid/water solution) were then added.

The mixture obtained was then put under reduced pressure of approx. 30 mbar. The reaction was continued for a period of 3 hours. The product was extruded into a water bath and granulated. The product obtained had a relative viscosity of between 1.45 and 1.6 and a melting point between 105 and 115° C.

The films were produced from the following components:
component (a): an ethylene/methyl acrylate copolymer with an 82/18 weight ratio, having an MFI of 2 (190° C./2.16 kg);
component (b): an ethylene/methyl acrylate/ glycidyle methacrylate terpolymer in a 76/18/8 weight ratio, having an MFI of 6 (190° C./2.16 kg);
component (c): a modified polyamide obtained according to the operating method indicated above.

The compositions of examples 2, 3 and 4 and comparative example 1 were produced in a twin-screw extruder having a length equal to 30 times the diameter and an extrusion was carried out under standard conditions suitable for 50 μm film products, the output being 20 kg/h. The rods obtained were converted into granules, which were in turn converted into films by a casting technology. The water vapor permeability was measured using the method described in the ASTM E 96 standard, method BW (film in contact with water) in an oven at a temperature of 38° C. and an ambient relative humidity of 50%, these values being maintained throughout the duration of the measurement. The water vapor permeability result is given in g/m$^2$/24 h for films 50 μm in thickness. Table 1 below was obtained:

TABLE 1

| | Comparative Example 1 | Example 2 | Example 3 | Example 4 |
|---|---|---|---|---|
| Compound (a) | 100 | 67 | 56 | 48 |
| Compound (b) | — | 3 | 4 | 12 |
| Compound (c) | — | 30 | 40 | 40 |
| Flux (g) | 75 | 625 | 910 | 750 |

An additional trial was carried out with a composition based on polymers (a), (b) and (c) identical to that of example 3. This composition was extruded directly by blending the granules of polymers (a), (b) and (c) on an extrusion-lamination line, forming a 25 μm film laminated to a polypropylene nonwoven substrate at a rate standard for this type of technology, being greater than 100 m/min. The structure obtained was of good quality, had no defects in the breathable film, and with satisfactory adhesion between the film and the nonwoven substrate.

The invention claimed is:

1. A breathable film comprising a blend of:
   from 45%-75% of at least one polymer (a) taken from the group comprising an ethylene/alkyl(meth)acrylate copolymer (a1), an optionally neutralized ethylene/alkyl (meth)acrylic acid copolymer (a2), an ethylene/vinyl monomer copolymer (a3), the (a1)/(a2) blend, the (a1)/(a3) blend, the (a2)/(a3) blend and the (a1)/(a2)/(a3) blend;
   from 3% to 15% of at least one functionalized polyethylene (b) wherein a and b are not of the same and are not both an ethylene /alkyl/(meth)acrylate copolymer; and
   from 25% to 45% of at least one copolymer (c) having a melting point of between 80 and 150° C. and comprising copolyamide blocks and polyether blocks; said film having a water vapor permeability of about 625 to about 910 g/m$^2$/24 h for a thickness of 50 μm, per ASTM E 96.

2. The breathable film of claims 1, in which the copolymer (c) having copolyamide blocks and polyether blocks is a polyetheresteramide.

3. The breathable film according to claims 1, in which the copolyamide blocks result from the condensation of at least one alpha,omega-aminocarboxylic acid or a lactam, at least one diamine and at least one dicarboxylic acid.

4. The breathable film according to claim 1, in which the copolyamide blocks are comprised of at least two blocks selected from 6, 11, 12, 6,6, 6,10 or 6,12 blocks.

5. The breathable film according to claims 1, in which the polyether blocks are PEG blocks.

6. The breathable film according to claim 1, in which the alkyl (meth)acrylate (a1) is chosen from n-butyl acrylate, isobutyl acrylate, 2-ethylhexyl acrylate, cyclohexyl acrylate, n-octyl acrylate, methyl methacrylate and ethyl methacrylate.

7. The breathable film as claimed in one of claim 1, in which the functionalized polyethylene (b) is a functionalized ethylene/alkyl (meth)acrylate copolymer.

8. The breathable film as claimed in one of claim 1, in which the functionalized polyethylene (b) is a polyethylene or an ethylene/alkyl (meth)acrylate copolymer, functionalized by a monomer chosen from (i) an unsaturated carboxylic acid, (ii) an unsaturated carboxylic acid anhydride and (iii) an unsaturated epoxide, by grafting or copolymerization.

9. The breathable film according to claim 1, in which the functionalized polyethylene (b) is grafted or copolymerized with a glycidyl methacrylate.

10. The breathable film as according claim 1, in which the sum of the polymers (a) and (b) represents more than 50%, by weight of the final composition.

11. The breathable film according to claim 1, further having a thickness between 10 and 200 μm.

12. The breathable film of claim 1, in which the copolymer (c) has a melting point between 90 and 135° C.

13. A process for manufacturing a film according to claim 1, comprising an extrusuion of said film.

* * * * *